April 8, 1952 L. O. FRENCH Re. 23,476

AUTOMATIC FUEL INJECTOR

Original Filed May 8, 1945

INVENTOR.

Louis O. French

Reissued Apr. 8, 1952 Re. 23,476

UNITED STATES PATENT OFFICE 23,476

AUTOMATIC FUEL INJECTOR

Louis O. French, Milwaukee, Wis.

Original No. 2,516,690, dated July 25, 1950, Serial No. 592,675, May 8, 1945. Application for reissue December 31, 1951, Serial No. 264,331.

16 Claims. (Cl. 123—139)

Matter enclosed in heavy brackets [ ] appears in the original patent but forms no part of this reissue specification; matter printed in italics indicates the additions made by reissue.

The invention relates to automatic fuel injectors for internal combustion engines.

One of the objects of the present invention is to provide an injector of the type above described in which the metering of the fuel is effected by varying the stroke of the actuator piston by varying the amount of checking fluid in a checking cylinder. This method of effecting the metering of the fuel simplifies the high pressure pump structure and reduces leakage losses therefrom and in the preferred form in which a checking piston cooperates with a port in the checking cylinder provides a more efficient metering of the charge since the metering control edge is on the checking piston, of considerably larger diameter than the pump plunger. It also effectively checks the outward movement of the piston noiselessly and without shock.

A further object of the invention is to provide means for varying the rate of injection by varying the rate of discharge of the checking fluid from the checking cylinder.

This application is a continuation in part of my copending application Serial No. 578,695, filed February 19, 1945, now abandoned, as to common claimable subject matter relating to the checking or neutralizing of shocks incident to the operating piston coming to a stop at the end of its stroke and to the variable timing of the injection by an adjustable automatic pressure operated valve.

The invention further consists in the several features hereinafter set forth and more particularly defined by claims at the conclusion hereof.

Figure 1:
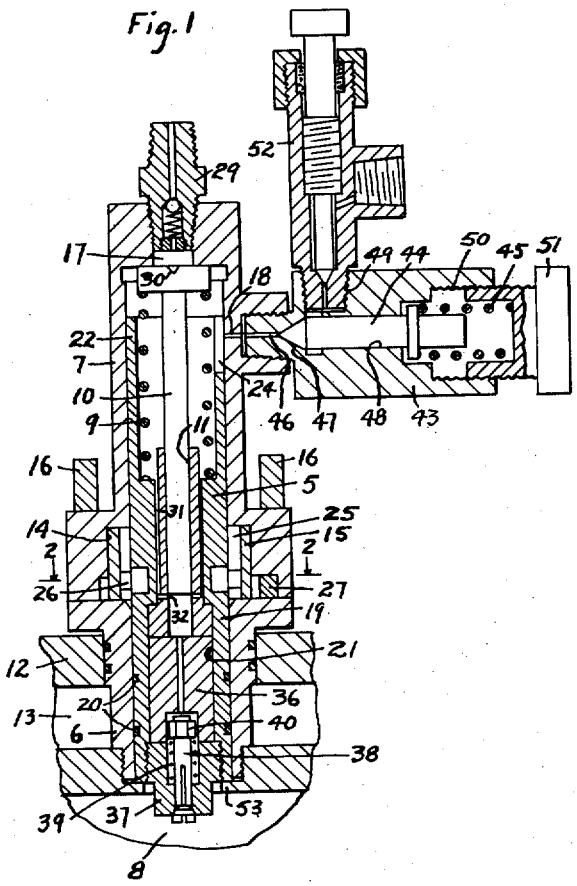
Fig. 1 is a vertical sectional view through a fuel injector embodying the invention.

For a non-fixed spray pattern the injector includes a reciprocatory piston member 5 operating in a casing formed by a sleeve or cylinder 6 and a closed end cylinder 7 and moved outwardly by the compressed gases in the combustion chamber 8 of the engine and inwardly by a spring 9, a variable fluid means for checking the outward movement of and controlling the stroke of the member 5, a sprayer mounted in member 5 and a high pressure pump including a relatively stationary pump plunger 10 held by the spring 9 against the closed end of the cylinder 7 and working in a bore 11 in the member 5.

The cylinder 6 is detachably fitted in the head 12 of the engine and extends through its cooling space 13. The cylinder 7 has a differential bore 14 in which the hub of pinion 15 surrounding a portion of the piston 5 is rotatably mounted and is supported by sleeve 6 and is clamped thereto by a suitable work holding clamp whose forked ends 16 are shown. This cylinder has a checking fluid inlet 17, where a timing valve is used, and a relief port 18.

The piston 5 has an operating piston portion 19 working in the sleeve and provided with piston rings 20 and a bore 21 threaded at its inner end and reduced at its outer end to receive a pump barrel having the bore 11 therein.

The variable fluid check for checking the outward movement of the member 5 includes a checking piston 22 forming part of it and notched at its upper end to provide control edges 23 and 24 which cooperate with port 18 to control the amount of checking fluid released from cylinder 7 during the outward movement of member 5. As soon as member 5 is moved outwardly to a point where the control edge 24 laps port 18, the fluid remaining in said cylinder acts to check its further movement and, edge 24 being inclined, rotation of member 5 relative to the port 18 will cause the lapping of the port sooner or later in the outward movement of said member and rotation of member 5 to lap either edge 23 or 24 will prevent any appreciable movement thereof.

Figure 4:
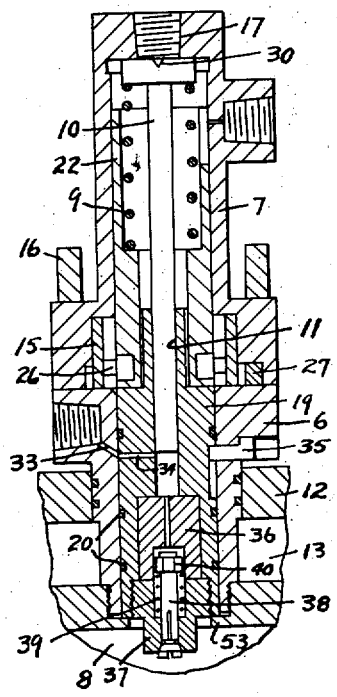
Fig. 4 is a detailed sectional view showing certain modifications.
Figure 3:
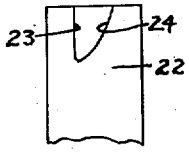
Fig. 3 is a detailed side elevational view of the checking piston.
Figure 2:
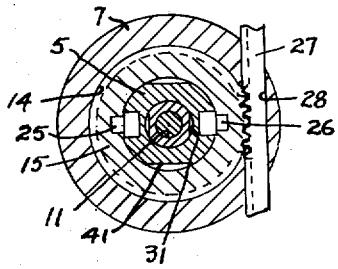
Fig. 2 is a detailed horizontal sectional view taken on the broken line 2—2 of Fig. 1.

The pinion 15 is provided with keyways 25 to receive keys 26 anchored in member 5, and is rotated by a rack 27 slidably mounted in a guide slot 28 in cylinder 7.

Where a timing valve is used, a conventional spring closed check valve 29 controls the inlet of checking fluid from a low pressure fuel supply line (not shown) to the inlet 17 and through grooves 30 in the top of the pump plunger to cylinder 7 and through flats 31 on the barrel to ports 32 therein controlled by the plunger 10. Without the timing valve checking fluid may be introduced directly through the port 18. Where the fuel is gasoline or it is desired to use a lubricant as the checking fluid, the modification shown in Fig. 4 may be used in which the fuel is admitted from a supply port 33 in sleeve 6 to a port 34 in the piston 19 connecting with the bore 11 and controlled by the plunger 10. Fig. 4 also shows the piston 19 slidably keyed to sleeve 6 by a removable key 35 for a fixed spray pattern and the checking piston 22 as a separate member having abutting sealing engagement with the top of the piston 19 and held against it by the spring 9. Piston 22 is rotated by the same means as that previously described.

The sprayer may be of any suitable construction and includes the pump discharge valve. As shown the sprayer includes a casing sleeve 36, a valve housing, nozzle, and nut member 37, a valve 38 having a grooved stem, a valve closing spring 39 and a spring holding nut 40. The member 37 has threaded connection with the threaded end of bore 21 and acts as a clamping nut to clamp member 36 in sealing engagement with it and the lower end of bore 11. The valve head and its seat form the nozzle. Other forms of sprayers such as differential needle or pintle type nozzles may be used if desired. The piston portion 19 has wrench engaging flats 41 thereon to facilitate tightening or loosening the threaded connection above described.

The loading of spring 9 or spring 39 may be used to determine the time of injection and port 18 then connect with a source of fuel or checking fluid supply, but where a considerable range of timing is required to adapt the device for different types of engines or to change the time during running a variable pressure relief valve comprising a valve casing 43, a valve 44, and an adjustable closing spring 45 is associated with the relief port 18.

The casing 43 has a passage 46 connecting port 18 with a valve seat 47 and a guide bore 48 enlarged adjacent the seat and connected by a return passage 49 in any suitable manner to the checking fluid supply and has a threaded end 50 for a manually adjustable spring tensioning nut 51. Remote controlled spring tensioning means may also be used, if desired. The loading of spring 45 acting to close the valve is sufficient to check the movement of the piston member 5 until the desired time for injection, near the end of the compression stroke, has been reached, and this time may be varied to suit engine operating conditions.

The rate at which the checking fluid is discharged from checking cylinder 7 will vary with engine speed but may be independently varied by a manually adjustable needle throttle valve 52 which controls passage of the fluid from the passage 49 to an outlet passage connectable with the checking fluid supply line. Adjustment of valve 52 relative to its seat varies the area of the discharge orifice between said seat and valve and thus the rate at which checking fluid is released from the checking cylinder and closing of said valve will prevent any checking fluid being discharged from said cylinder and stop the operation of the injector.

The piston member 5 is limited in its inward movement by a suitable stop means, for example an inwardly projecting flange 53 at the lower end of the threaded bore 54 in which the sleeve 6 is mounted.

With the above construction, piston portion 19 being exposed to the pressure of the gases in the combustion chamber 8 of the engine, when this pressure exceeds the loading of spring 45, port 18 is opened to relief and piston member 5 moves outwardly closing off port 32 or 34 and building up pressure in the high pressure fuel pump chamber formed by bore 11 which then acts to overcome the pressure of spring 39 and opens valve 38 to cause the injection of fuel. The unit pressure imposed on the checking fluid to hold the operating piston against movement is relatively low compared to the fuel injection pressure and as shown is the same as the engine compression pressure which simplifies assembly and manufacture but may be still less where the diameter of the piston 22 is made greater than that of the piston 19. Rotary movement of piston 22 by the control rod 27 changes the amount of fuel injected, adjustment of the relief valve, when used, changes the time of injection and adjustment of valve 52, when used, changes the rate of fuel injection.

I desire it to be understood that this invention is not to be limited to any particular form or arrangement of parts except in so far as such limitations are included in the claims.

What I claim as my invention is:

1. In a fuel injector of the character described, the combination of an operating piston movable in response to gases under compression, a casing in which said piston works including a closed end cylinder having differential bores and a relief port in one of said bores, a checking piston carried by said operating piston and working in the bore having said relief port and in contact with a checking fluid therein and provided with an inclined control edge cooperating with said port to vary the amount of checking fluid within said bore to variably limit the movement of said pistons, means for angularly shifting said checking piston relative to said port comprising a sleeve rotatively mounted in another of said bores and having a slidably keyed connection with said checking piston, a fuel pump including a bore in said operating piston and a pump plunger working in said bore to discharge fuel therefrom on the movement of said operating piston by said gases and held in engagement with the closed end of said cylinder, a sprayer including a pump discharge valve mounted in said operating piston, means for admitting a checking fluid into the bore of said cylinder having said relief port, and means for admitting fuel to said pump.

2. In a fuel injector of the character described the combination of an operating piston movable in response to gases under compression, a casing in which said piston works including a closed end cylinder having differential bores and a relief port in one of said bores, a checking piston carried by said operating piston and working in the bore having said relief port and in contact with a checking fluid therein and provided with an inclined edge cooperating with said port to variably limit the movement of said pistons by varying the amount of checking fluid within said bore to vary the stroke of said operating piston, means for angularly shifting said checking piston relative to said port comprising a sleeve rotatively mounted in another of said bores and having a slidably keyed connection with said checking piston, a fuel pump including a bore in said operating piston and a pump plunger working in said pump bore to discharge fuel therefrom on the movement of said operating piston by said gases, a spring to return said pistons to their inner positions and hold said plunger against the upper end of said cylinder, means for admitting a checking fluid into the bore of said cylinder having said relief port, means for admitting fuel to said pump, and a sprayer including a pump discharge valve mounted in said operating piston.

3. In a fuel injector of the character described, the combination of a piston movable in response to gases under compression, a fuel pump having its bore in said piston and a pump plunger held against longitudinal movement and working in said bore to discharge fuel therefrom on the movement of said piston by said gases, a chamber in which said piston works containing a checking fluid in contact with a part of said piston and operable to stop its movement, means including said piston for controlling the discharge of checking fluid from said chamber to control the stroke of said piston and thereby vary the amount of fuel delivered by said fuel pump, and an adjustable throttle valve to control the rate of discharge of the checking fluid to control the rate of fuel injection.

4. In a fuel injector of the character described, the combination of a member including an operating piston and a checking piston movable in response to gases under compression, a fuel pump having its bore in said operating piston and a pump plunger held against longitudinal movement and working in said bore to discharge fuel therefrom on the movement of said member by said gases, a chamber in which said member works containing a checking fluid forming a hydraulic stop and having a relief port for said fluid, said checking piston working in said chamber in contact with said checking fluid and angularly movable relative to said relief port, and means on said checking piston cooperating with said relief port to vary the amount of checking fluid discharged through said port to variably limit the movement of said member and thereby vary the amount of fuel delivered by said fuel pump.

5. In a fuel injector of the character described, the combination of a member including an operating piston and checking piston movable in response to gases under compression, a fuel pump having its bore in said operating piston and a pump plunger held against longitudinal movement and working in said bore to discharge fuel therefrom on the movement of said member by said gases, a cylinder in which said member works containing a checking fluid forming a hydraulic stop and having a relief port for said fluid, said checking piston working in said chamber in contact with said checking fluid and angularly movable relative to said relief port and having a control edge cooperating with said relief port to vary the amount of checking fluid discharged through said port to variably limit the movement of said member and thereby vary the amount of fuel delivered by said fuel pump, and means for angularly adjusting said checking piston relative to said relief port.

6. In a fuel injector of the character described, the combination of a member including an operating piston and checking piston movable in response to gases under compression, a fuel pump having its bore in said operating piston and a pump plunger held against longitudinal movement and working in said bore to discharge fuel therefrom on the movement of said member by said gases, a cylinder in which said member works containing a checking fluid forming a hydraulic stop and having a relief port for said fluid, said checking piston working in said cylinder in contact with said checking fluid and angularly movable relative to said relief port, means on said checking piston cooperating with said relief port to vary the amount of checking fluid discharged through said port to variably limit the movement of said member and thereby vary the amount of fuel delivered by said fuel pump, and a variable timing valve controlling said relief port to vary the time of injection.

7. In a fuel injector of the character described, the combination of a member including an operating piston and checking piston movable in response to gases under compression, a fuel pump having its bore in said piston and a pump plunger held against longitudinal movement and working in said bore to discharge fuel therefrom on the movement of said piston by said gases, a cylinder in which said member works containing a checking fluid forming a hydraulic stop and having a relief port for said fluid, said checking piston working in said cylinder in contact with said checking fluid and carried by said operating piston but radially movable relative thereto to center itself in said cylinder and angularly movable relative to said relief port and said operating piston, said checking piston having an inclined control edge cooperating with said relief port to vary the amount of checking fluid discharged through said port to variably limit the movement of said member and thereby vary the amount of fuel delivered by said fuel pump, means for angularly adjusting said checking piston relative to said relief port, and a timing valve controlling said relief port to vary the time of injection.

8. In a fuel injector of the character described, the combination of an operating piston movable in response to gases under compression, a fuel pump having a bore in said piston and a pump plunger held against longitudinal movement and working in said bore to discharge fuel therefrom on the movement of said piston by said gases, means controlled by said pump plunger for admitting fuel into said bore, a cylinder in which said operating piston works containing a checking fluid forming a hydraulic stop, a checking piston working in said cylinder in contact with said checking fluid and carried by said operating piston, means for admitting a checking fluid into said cylinder, said cylinder having a relief port for said fluid, said checking piston being angularly movable relative to said relief port and operating piston, and means on said checking piston cooperating with said relief port to vary the amount of checking fluid discharged through said port to variably limit the movement of said pistons and thereby vary the amount of fuel delivered by said fuel pump.

9. In a fuel injection system, the combination with a fuel chamber and a plunger working in said chamber to form a variable stroke fuel pump, means for effecting relative reciprocatory movement between said chamber and plunger comprising an operating piston operable by a compressible drive means, a variable volume chamber containing a checking fluid forming a hydraulic stop in which a part of said piston operates in contact with said fluid, means for varying the volume of the checking fluid released from said checking fluid chamber to variably limit the stroke of said operating piston and hence the stroke of said fuel pump, and means for varying the timing of the release of checking fluid from said chamber to vary the time of injection.

10. In a fuel injection system, the combination with a fuel chamber and a plunger working in said chamber to form a variable stroke fuel pump, means for effecting relative reciprocatory movement between said chamber and plunger comprising an operating piston operable by a compressible drive means, a variable volume chamber containing a checking fluid forming a hydraulic stop in which a part of said piston operates in contact with said fluid, means for varying the volume of the checking fluid released from said checking fluid chamber to variably limit the stroke of said operating piston and hence the stroke of said fuel pump, and a pressure actuated relief valve controlling the release of checking fluid from said chamber, and means for controlling said relief valve to vary the time of operating thereof and hence the time of injection.

11. In a fuel injector of the character described, the combination of an operating piston movable in response to fluid pressure, a fuel pump having relatively movable parts including a part moved by said piston, and means for varying the beginning of the movement of said operating piston comprising a chamber containing a checking liquid and provided with a relief port, a pressure actuated relief valve controlling passage of checking liquid from said chamber through said port, and means controlling said relief valve to vary the time of opening thereof.

12. In a fuel injector of the character described, the combination of an operating piston movable in response to fluid pressure, a fuel pump having relatively movable parts including a part movable with said piston, and means for checking the outward movement of said piston comprising a chamber *provided with a relief port and* containing a checking fluid, a piston working in said chamber and operatively connected to said operating piston and adapted to lap said relief port in the outstroke position of said operating piston to trap a body of checking liquid in said chamber.

13. In a fuel injector of the character described, the combination of an operating piston movable in response to fluid pressure, a fuel pump having relatively movable parts including a part movable with said piston, a chamber containing a checking liquid and provided with a relief port, a checking piston working in said chamber and operatively connected to said operating piston, a pressure actuated relief valve controlling passage of checking liquid from said chamber through said relief port, and means for controlling the opening pressure of said relief valve to vary the beginning of the movement of said operating piston, said checking piston adapted to lap said relief port in the outstroke position of said operating piston.

14. In an automatic fuel injector, the combination of a cylinder, a piston member working in said cylinder and having an actuating piston portion movable in response to fluid pressure and a checking piston portion provided with a control edge, said cylinder providing a chamber for a checking fluid and having a relief port cooperating with said control edge to vary the amount of checking fluid in said chamber, means exterior of said cylinder and extending into the same and operatively connected to said piston member between the sealing portions formed by said operating and checking portions thereof to angularly adjust said member relative to said relief port, and a high pressure pump including a pump plunger held against longitudinal movement and a pump chamber associated with said piston member.

15. In an automatic fuel injector, the combination with a casing, of a piston member operable in said casing in response to fluid pressure having an actuating piston portion at one end, a checking piston portion at the other end working in a part of said casing containing a checking fluid, and an intermediate portion, said checking piston portion provided with a control edge, said cylinder having a relief port cooperating with said control edge to vary the amount of checking fluid in said casing, and an angularly adjustable member having a slidably keyed connection with the intermediate portion of said piston member to adjust said member relative to said relief port.

16. In a fuel injector, the combination of a member including an operating piston and checking piston movable in response to fluid pressure, a fuel pump having relatively movable parts including a part moving with said member, a cylinder in which said member works containing a checking fluid forming a hydraulic stop and having a relief port for said fluid, said checking piston working in said chamber in contact with said checking fluid and angularly movable relative to said relief port and having a control edge cooperating with said relief port to vary the amount of checking fluid discharged through said port to variably limit the movement of said member and thereby vary the amount of fuel delivered by said pump, and means for angularly adjusting said checking piston relative to said relief port.

LOUIS O. FRENCH.

REFERENCES CITED

The following references are of record in the file of this patent or the original patent:

UNITED STATES PATENTS

| Number | Name | Date |
|---|---|---|
| 1,497,258 | Beals | June 10, 1924 |
| 1,990,714 | Skooltvet | Feb. 12, 1935 |
| 1,995,459 | Olsen | Mar. 26, 1935 |
| 2,052,459 | Geiser | Aug. 25, 1936 |

FOREIGN PATENTS

| Number | Country | Date |
|---|---|---|
| 187,950 | Great Britain | Nov. 29, 1923 |
| 481,181 | Great Britain | June 3, 1936 |
| 565,429 | Great Britain | Nov. 9, 1944 |